(12) United States Patent
Hirose et al.

(10) Patent No.: US 7,218,023 B2
(45) Date of Patent: May 15, 2007

(54) SPINDLE MOTOR

(75) Inventors: Jun Hirose, Kitasaku-Gun (JP); Katsutoshi Nii, Ibaragi-Ken (JP); Shunichi Togashi, Chiba-Ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 362 days.

(21) Appl. No.: 10/331,698

(22) Filed: Dec. 30, 2002

(65) Prior Publication Data
US 2003/0132676 A1   Jul. 17, 2003

(30) Foreign Application Priority Data
Jan. 15, 2002   (JP) .............................. 2002-006626

(51) Int. Cl.
*H02K 7/08* (2006.01)

(52) U.S. Cl. ....................... 310/90; 310/90.5

(58) Field of Classification Search ................ 310/90, 310/40 R, 67 R, 90.5, 112; 384/110, 100; 360/99.08
See application file for complete search history.

(56) References Cited

U.S. PATENT DOCUMENTS

| | | | |
|---|---|---|---|
| 3,964,805 A | 6/1976 | Schulien | |
| 5,014,581 A | 5/1991 | Komanduri et al. | |
| 5,448,120 A | 9/1995 | Schaule et al. | |
| 5,689,146 A | 11/1997 | Cheever | |
| 5,855,437 A | 1/1999 | Lee | |
| 5,873,657 A | 2/1999 | Lee | |
| 5,947,608 A | 9/1999 | Kim | |
| 5,969,448 A * | 10/1999 | Liu et al. | 310/90 |
| 5,980,113 A | 11/1999 | Grantz | |
| 6,137,650 A * | 10/2000 | Heine et al. | 360/98.07 |
| 6,144,523 A | 11/2000 | Murthy et al. | |
| 6,154,339 A | 11/2000 | Grantz et al. | |
| 6,280,088 B1 | 8/2001 | Leuthold et al. | |
| 6,292,328 B1 | 9/2001 | Rahman et al. | |
| 6,322,252 B1 | 11/2001 | Grantz et al. | |
| 6,756,715 B2 * | 6/2004 | Hirose et al. | 310/90 |
| 6,946,764 B2 * | 9/2005 | LeBlanc et al. | 310/90 |
| 2002/0114547 A1 * | 8/2002 | Nottingham | 384/110 |
| 2004/0119353 A1 * | 6/2004 | LeBlanc et al. | 310/90 |

FOREIGN PATENT DOCUMENTS

JP   06-315242   * 8/1994

* cited by examiner

*Primary Examiner*—Darren Schuberg
*Assistant Examiner*—Nguyen N. Hanh
(74) *Attorney, Agent, or Firm*—Joel E. Lutzker, Esq.; John C. Garces, Esq.; Schulte Roth & Zabel

(57) ABSTRACT

The spindle motor includes a rotational shaft 30 which has a conical portion 34, whose outer surface gradually widens toward a thrust dynamic pressure bearing 70, and a straight portion 33 with a fixed outer diameter. Radial dynamic pressure bearing 60 supports the radial load of the rotating shaft 30. The radial bearing has a conical bearing surface 64 and a straight bearing surface 63 corresponding to the conical portion 34 and the straight portion 33 of the rotating shaft 30, respectively. Rotating shaft 30 is supported and aligned during rotation by fluid dynamic forces generated by the conical portion 34.

12 Claims, 5 Drawing Sheets

[Fig. 1]
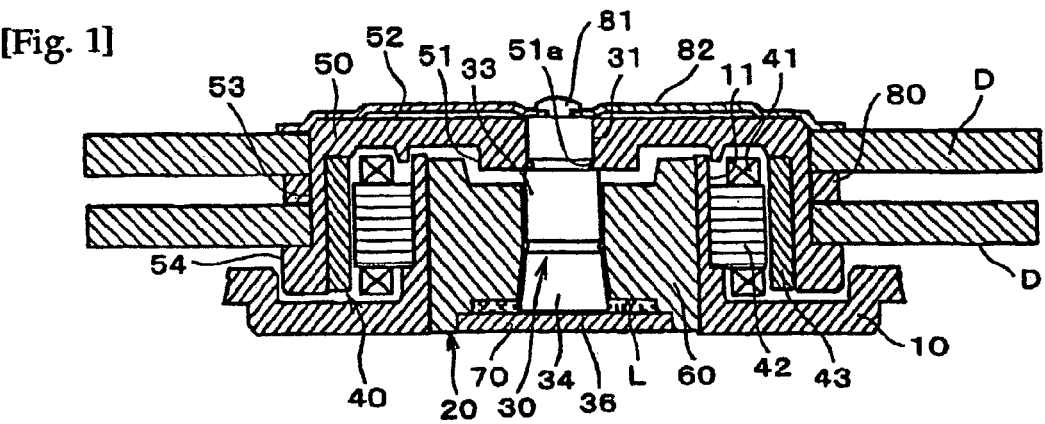
[Fig. 2]
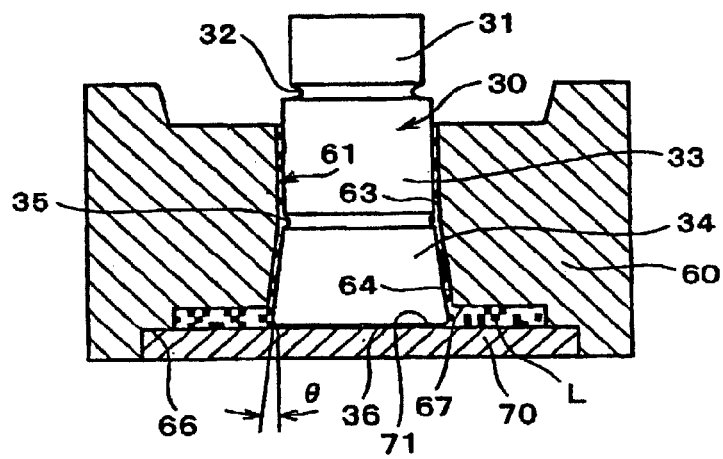
[Fig. 3]
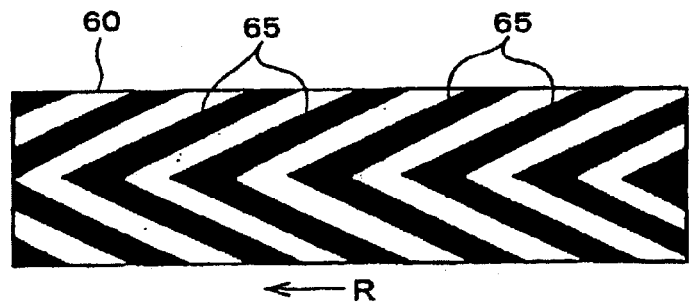

[Fig. 4]
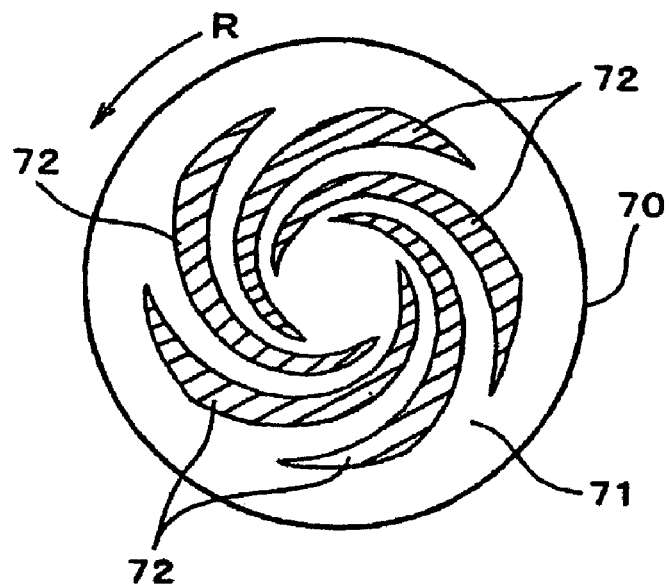
[Fig. 5]
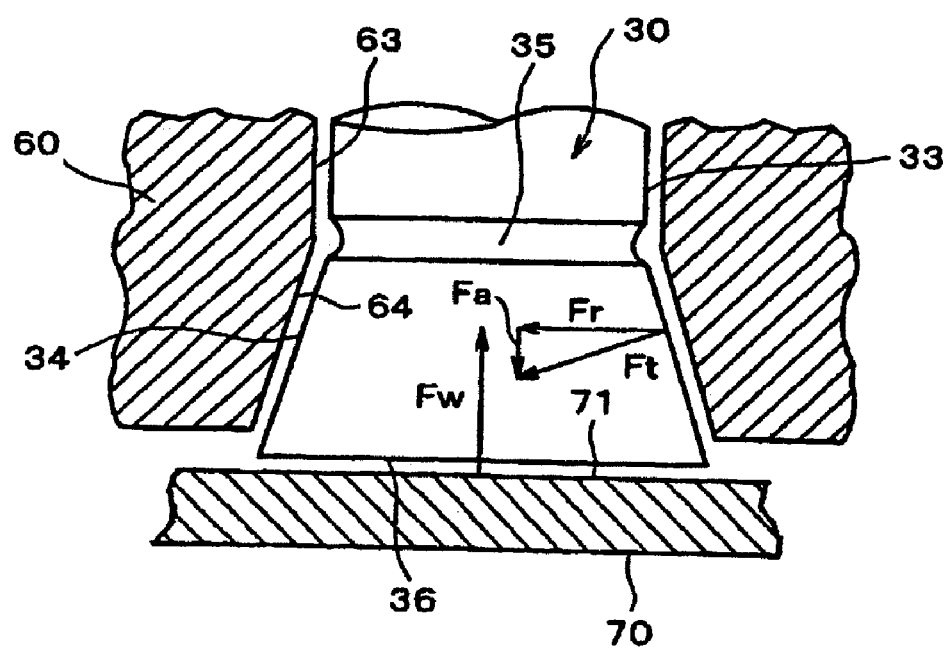

[Fig. 6]
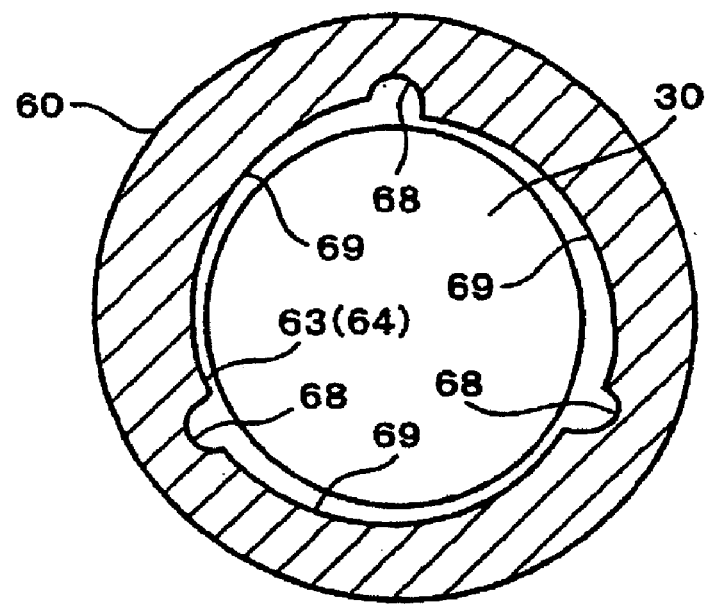
[Fig. 7]
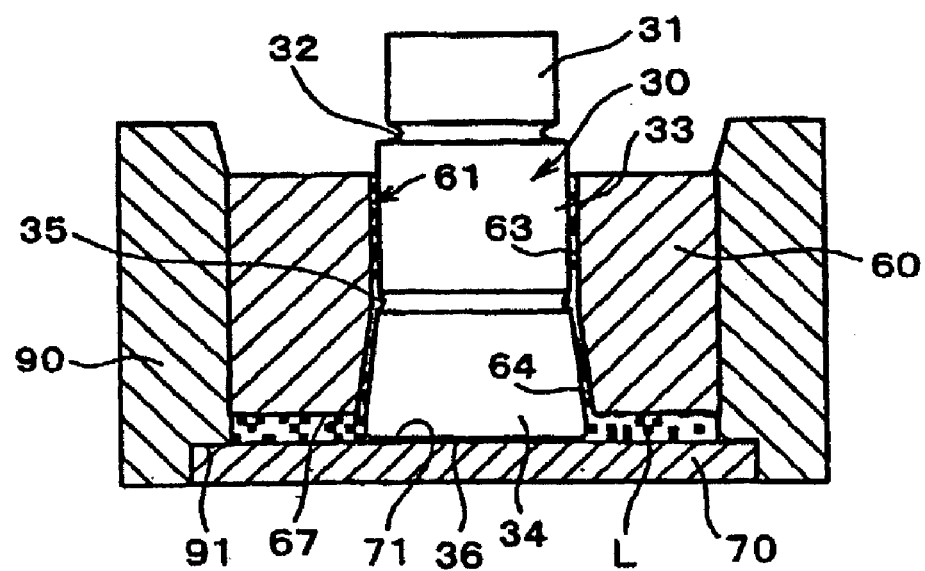

[Fig. 8]
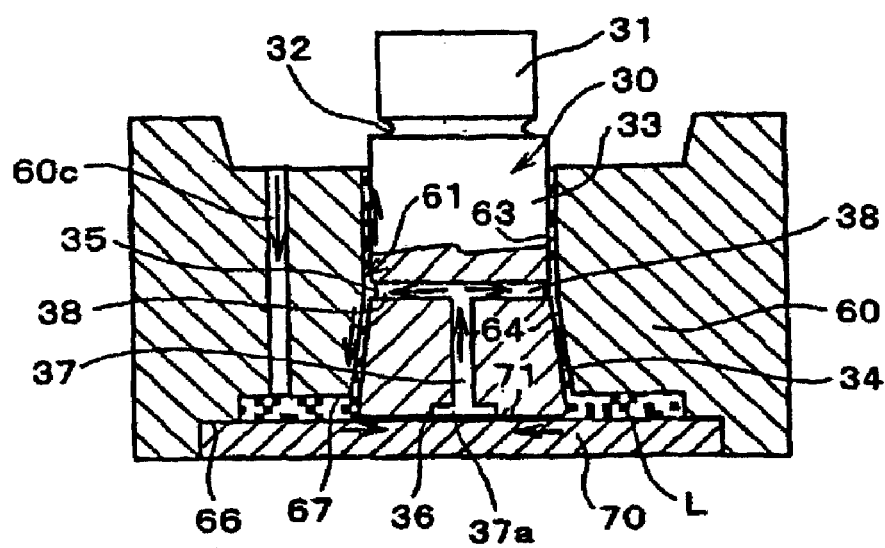
[Fig. 9]
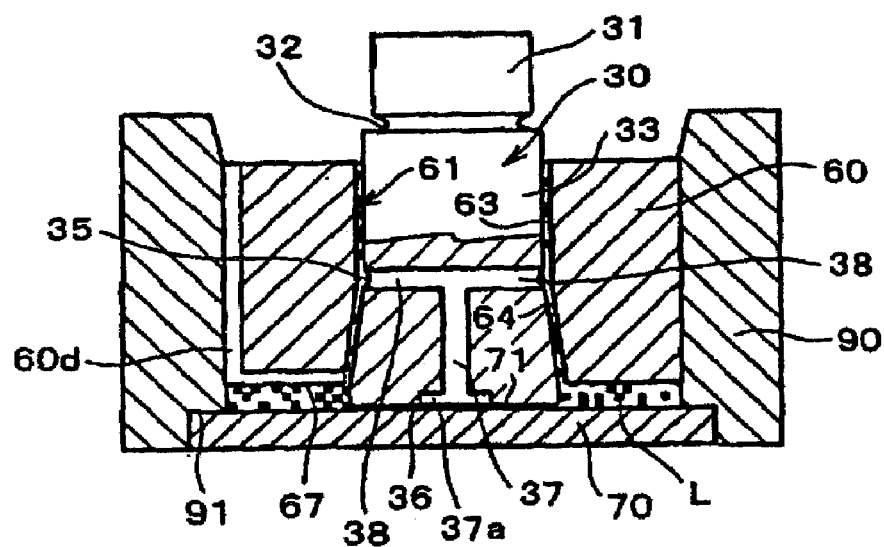

SPINDLE MOTOR

RELATED APPLICATIONS

This application claims all rights of priority to Japanese Patent Application No. 2002-006626, filed on Jan. 15, 2002.

BACKGROUND OF THE INVENTION

1. Field of the Invention

The present invention relates to spindle motors mounted in such as information devices or acoustic devices which require precise rotation, and in particular to spindle motors to be used in HDDs (hard disk drives) in magnetic disk units.

2. Related Prior Art

Spindle motors for HDDs are ordinarily constructed with a hub on a rotating shaft rotated by an electromagnetic motor and supported on bearings so as to rotate freely. Known examples are disclosed in (1) Japanese Patent Application (Kokai) Hei 11-262214 and (2) Japanese Patent Application (Kokai) 2001-289242. Bearings suitable for these spindle motors comprise combinations of radial bearings and thrust bearings respectively supporting the radial loads and thrust loads of the rotating shafts. The radial bearings and the thrust bearings are fluid dynamic bearings supporting the rotating shafts with high precision because of the dynamic pressure action of lubricants.

In addition to high rotation precision, HDD motors mounted in personal computers and notebook personal computers require high quietness and shock resistance. It is also desirable to reducing thickness of the end-product. Fluid dynamic bearings are effective from the standpoint of ensuring quietness and rotation precision. The shock resistance is ensured by providing a fluid dynamic thrust bearing for positioning and restraining removal of the rotating shaft in the axial direction. The positioning in the axial direction is particularly important in HDD motors where magnetic disks have to have their positions set in the axial direction. However, in spindle motors furnished with thrust bearings, the rotating shafts sometimes tend to shift easily in the axial direction and separate from the thrust bearings because of the dynamic pressure force generated by the thrust bearing. In order to suppress this phenomenon to ensure proper positioning and to prevent the rotating shaft from moving in the axial direction, the following various means have been previously adopted.

(1) Staggering the magnetic centers of the motor stator and the motor magnet so that the shaft-carrying hub to which the motor magnet is attached is pulled downwardly in the direction of the thrust bearing.

(2) Positioning a magnetic plate opposite the motor magnet attached to the hub, to create a magnetic force by which the hub is attracted in the thrust bearing direction.

(3) Providing a permanent magnet, as described in prior patent cite, to attract the hub in the thrust bearing direction with the permanent magnet.

(4) Providing a flange at the end of the thrust bearing side in the rotating shaft, as described in prior patent (2), to prevent disengagement of the rotating shaft from the radial bearing. Also, in this construction, dynamic pressure force is generated between the flange and the radial bearing, so that the rotating shaft is pulled in the direction of the thrust bearing by this dynamic pressure force.

However, in the motor having staggered magnetic centers, an electromagnetic noise is generated resulting in a loss of quietness. The motor construction having a magnetic plate results in a loss of drive force in the motor, and this is particularly undesirable because it puts a limit on the value of current in devices where power is low as in notebook computers. With respect to motor constructions disclosed in patents (1) and (2), along with increase of the number of parts and complications in manufacturing, it is inconvenient to reduce thickness of the product utilizing these motors.

Also with respect to a rotation precision, when both the radial bearing and the thrust bearing are fluid dynamic bearings, the rotation precision is sufficiently ensured, but it has been difficult to construct HDD motors in which both the bearing stiffness and bearing loss were optimized, that is with both a high bearing stiffness and a small bearing loss.

SUMMARY OF THE INVENTION

Accordingly, the present invention has as its object providing a spindle motor that ensures sufficient quietness and rotation precision.

It is another object of the present invention to provide a spindle motor capable of achieving positioning of the rotating shaft with a simple construction while achieving an increase in shock resistance.

It is a further object of the present invention to provide a spindle motor allowing for a reduced thickness of the product and keeping down the number of parts.

It is still another object of the present invention to provide a spindle motor optimizing bearing stiffness and bearing loss of the radial bearing and the thrust bearing.

The present invention is a spindle motor including (a) a rotating shaft supported in its free rotation by a radial fluid dynamic bearing and a thrust fluid dynamic bearing, (b) a rotating member attached to this rotating shaft, and (c) a motor that rotates the rotating members by electromagnetic action. In accordance with the preferred embodiment, the rotating shaft has a conical portion whose outer diameter expands gradually toward the thrust fluid dynamic bearing side and a straight portion with a fixed outer diameter. The radial fluid dynamic bearing has a conical bearing surface and straight bearing surface corresponding to the conical portion and the straight portion, respectively, of the rotating shaft.

In the present invention, the rotating shaft receives radial dynamic pressure from the radial dynamic pressure bearing and receives thrust dynamic pressure from the thrust dynamic pressure bearing, thereby obtaining quietness and rotation precision. The straight portion of the rotating shaft receives mainly radial dynamic pressure from the straight bearing surface of the radial dynamic pressure bearing. The conical portion receives dynamic pressure in a slanted direction against the outer peripheral surface of the conical portion, from the conical bearing surface of the radial fluid dynamic bearing. This dynamic pressure is a synthesis of radial dynamic pressure force, a component of force perpendicular to the axial direction and a component of force in the axial direction, a thrust dynamic pressure force. Thus, the dynamic pressure generated by the conical bearing surface has a thrust dynamic pressure component in addition to a radial dynamic pressure component. The generated thrust dynamic pressure component is directed toward the thrust dynamic bearing side because the conical portion expands toward the thrust dynamic pressure bearing side.

The rotating shaft receives thrust dynamic pressure in opposite directions from the fluid dynamic thrust bearing and the conical bearing surface of the radial dynamic pressure bearing. These opposing forces position the shaft in the axial direction and prevent it from falling out during rotation and, as a result, provide the shaft with an shock resistance. Thus, with the present invention it is possible to ensure shock resistance with a simple construction of the motor having a shaft with a conical part and a corresponding conical bearing surface, without provision of special additional parts. The present construction also avoids providing dynamic pressure generating grooves for positioning the rotating shaft and/or preventing it from falling out. The provided construction is useful for reducing the thickness of the product as well as for more efficient mass production. Also, since the positioning of the rotating shaft in the axial direction can be achieved without relying on the action of magnets, loss of drive force in the motor is suppressed and low expenditure of electric power is achieved. Further, since it is not necessary to stagger the motor stator and the magnetic center in order to position the rotating shaft in the axial direction, quietness is ensured in the motor constructed in accordance with the present invention.

The presently disclosed construction of the spindle motor optimizes the bearing stiffness and bearing loss of each bearing by supporting the rotating shaft with said radial fluid dynamic bearing and the thrust fluid dynamic bearing. Proportions of axial lengths of the conical bearing surface and straight bearing surface and the widening angle (taper angle) of the conical portion of the rotating shaft are suitably determined so that the above optimization is achieved.

In the present invention, grooves generating dynamic pressure are formed extending from the conical bearing surface onto the straight bearing surface of the radial dynamic pressure bearing. These grooves can be a plurality of herringbone grooves. The herringbone grooves are preferably V-shaped and formed so that the lowermost point of the "V" points in the direction of shaft's rotation resulting in generation of a high dynamic pressure.

The dynamic pressure generating grooves formed on the conical bearing surface of the radial dynamic pressure bearing, can be herringbone grooves. On the other hand, portions of these grooves extending to the straight bearing surface can be wedge-shaped with small intervals between them facing the direction of rotation of the rotating shaft.

The dynamic pressure generating grooves formed on the thrust bearing surface of the thrust fluid dynamic bearing can be a plurality of spiral grooves or herringbone grooves. Spiral grooves may be formed so as to point toward the center of the thrust bearing surface while curving along the rotation direction of the shaft so as to generate high dynamic pressure force. When the thrust pressure is generated by herringbone grooves, their tip crossing portions should preferably be formed so as to point toward the rotation direction of the rotating shaft so as to provide high dynamic pressure force.

A peripheral groove may be formed as an oil reservoir at the boundary between the straight portion and the conical portion on the outer peripheral surface of the rotating shaft. The radial bearing may be housed inside a housing.

The above and other objects, aspects, features and advantages of the invention will be more readily apparent from the description of the preferred embodiment thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which:

FIG. 1 is a vertical cross-sectional view of the HDD spindle motor constructed in accordance with the first embodiment of the present invention.

FIG. 2 is a vertical cross-sectional view of the bearing unit constructed in accordance with the first embodiment of the present invention.

FIG. 3 is an expanded view of the inner peripheral surface of the radial bearing formed with dynamic pressure generating grooves.

FIG. 4 is a plan view of the thrust bearing surface formed with spiral dynamic pressure generating grooves.

FIG. 5 is a vertical cross-sectional view of a portion of the spindle motor explaining the operation of the bearing unit and the rotating shaft in accordance with the first embodiment of the present invention.

FIG. 6 is a horizontal cross-sectional view showing lobe-shaped dynamic pressure generating grooves formed in the inner peripheral surface of the radial bearing.

FIG. 7 is a vertical cross-sectional view of the bearing unit constructed in accordance with the second embodiment of the present invention.

FIG. 8 is a vertical cross-sectional view of the bearing unit constructed in accordance with the third embodiment of the present invention.

FIG. 9 is a vertical cross-sectional view of the bearing unit constructed in accordance with the fourth embodiment of the present invention.

DETAILED DESCRIPTION OF THE PREFERRED EMBODIMENT AND THE DRAWINGS

Figure 4A:
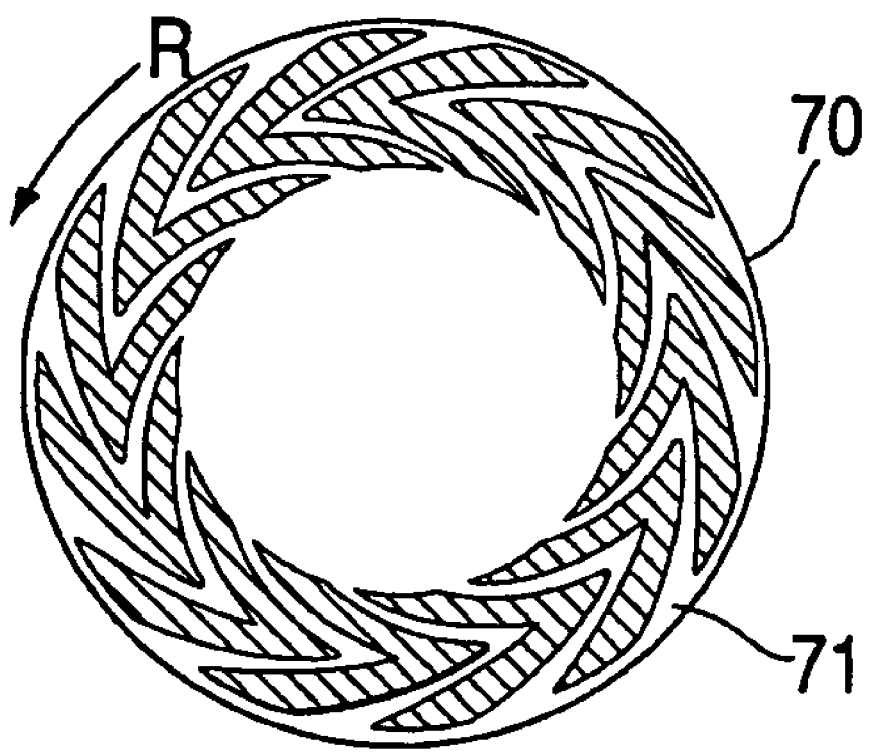
FIG. 4A is a plan view of the thrust bearing surface formed with herringbone dynamic pressure generating grooves.

The first preferred embodiment of the present invention is shown in FIGS. 1 to 6. FIG. 1 illustrates a sectional view of the spindle motor of the first preferred embodiment. This motor is designed to rotate two magnetic disks D, and it comprises a case 10, bearing unit 20, rotating shaft 30, motor 40 and a hub (rotating member) 50 supporting magnetic disks D. Rotating shaft 30 is preferably formed as one unit. Cylindrical holder portion 11 is formed in the center of case 10 and projects upward as shown in FIG. 1. The bearing unit 20 is housed inside the holder portion 11. The bearing unit 20 comprises a radial fluid dynamic bearing (hereinafter abbreviated as the radial bearing) 60 and a thrust fluid dynamic bearing (hereinafter abbreviated as the thrust bearing) 70 that covers the lower surface opening of radial bearing 60.

Rotating unitary shaft 30 is supported for rotation by the bearing unit 20. Hub 50 is attached to a hub fastening portion 31 which is the upper end of the rotating shaft 30. Hub 50 is cap-shaped and has a circular plate part 52 formed with nave 51 projecting inward at its center, a cylinder 53 extending downwardly from the peripheral edge of the circular plate part 52, and a brim 54 projecting outwardly from the peripheral edge of the cylinder 53. Hub fastening portion 31 of the rotating unitary shaft 30 is inserted through the nave 51 such that an annular projection 51a formed at the lower peripheral edge of nave 51 fits into a groove 32 (see FIG. 2) formed in the rotating unitary shaft 30, thus attaching the hub 50 to the rotating shaft 30. With this mode of fastening, the inner peripheral surface of the cylinder 53 of the hub 50 and the outer peripheral surface of the holder 11 of the case 10 are located opposite to each other. Motor 40 is constructed of motor stator 42 and motor magnet 43. The motor stator 42 having coils 41 wound around it is attached to the stationary case 10. The motor magnet 43 is attached to the rotatable hub 50.

An annular spacer 80 is placed between magnetic disks in the outer periphery of the cylinder 53 of the hub 50 the discs are supported on the hub 50 between the brim 54 and a clamper 82 attached by a screw 81 to the upper end surface of the rotating unitary shaft 30.

The above is the overall construction of the spindle motor of the first embodiment of the present invention. In this motor when a specified electric current is supplied to the coil 41 and an electromagnetic field generates from the motor stator 42, the hub 50 rotates around the rotating unitary shaft 30 because of the electromagnetic interaction generated between this electromagnetic field and the motor magnet 43. Thus, the hub 50 causes magnetic disks D to rotate.

Next, the construction of the bearing unit 20 and the rotating unitary shaft 30 will be described in detail.

As shown in FIG. 2, the upper end of the rotating unitary shaft 30 comprises the aforementioned hub fastening portion 31 located above the groove 32 and a straight portion 33 located below the groove 32 and having an outer diameter slightly larger than the diameter of the hub fastening portion 31. A conical portion 34 is preferably located at the lower end of the rotating unitary shaft 30 below the straight portion 33. Conical portion 34 has tapering sides that gradually expand in the direction of thrust bearing 70, thus gradually increasing the outer diameter of the unitary shaft 30. A peripheral groove 35 is preferably provided at the boundary between the straight portion 33 and the conical portion 34 to serve as an oil reservoir or an oil passage. In this embodiment, the length of each portion of the unitary shaft, i.e., the hub fastening portion 31, the straight portion 33 and the conical portion 34, is about ⅓ of the axial length of the rotating shaft 30.

The bearing unit 20 includes the thrust bearing 70 and the radial bearing 60, as mentioned above. Radial bearing 60 is substantially cylindrical, and, as shown in FIG. 2, has a shaft hole 61 for inserting the rotating shaft 30 therein. The straight bearing surface 63 and conical bearing surface 64 of the inner peripheral surface of the hole 61 correspond to the straight portion 33 and conical portion 34, respectively, of the rotating unitary shaft 30. As shown in FIG. 3, these bearing surfaces 63 and 64 have a plurality of herringbone grooves 65 having substantially V-shapes for generating radial dynamic pressure. Herringbone grooves 65 are formed at preferably equal intervals in the peripheral direction of their corresponding bearing surface. As shown in FIG. 3, the apex of each V-groove points toward the direction of rotation R of the rotating shaft 30. Grooves 65 are preferably formed extending from the straight portion of the bearing onto the conical portion of the bearing.

As shown in FIG. 2, annular cavities 66 and 67 are formed in two stages at the lower surface of the radial bearing 60. The thrust bearing 70 shaped as a circular plate is secured within the first stage cavity 66. The second stage cavity 67 is connected with the shaft hole 61 and comprises an oil reservoir 67. The thrust bearing 70 has a thrust bearing surface 71 opposing the end surface of the rotating unitary shaft 30, as shown in FIG. 4. The thrust bearing surface 71 has a plurality of spiral grooves 72 formed therein for generating thrust dynamic pressure. Thrust grooves 72 are formed so as to point toward the center of thrust bearing surface 71 while curving along the rotational direction of the rotating shaft 30. The grooves for generating thrust dynamic pressure may also be herringbone grooves comprised of multiple V-shaped grooves.

The rotating unitary shaft 30 is set into the radial bearing 60 by inserting the hub fastening portion 31 into the annular cavity 66 and then pushing the rotating shaft 30 upwards. The thrust bearing 70 is then fastened to the radial bearing 60 by being placed into the cavity 66. In the resulting assembly, a small gap is formed between the outer peripheral surface of the rotating unitary shaft 30 and bearing surfaces 63 and 64 of radial bearing 60. The gap is filled with lubricant L. The bearing unit 20 is fastened to the base 10 by pressing the radial bearing 60 into the holder 11 of the base 10 or fastening it by other known means, for example, by welding or adhesion.

Various suitable materials may be used for the bearing unit 20 and the rotating unitary shaft 30. For example, various stainless steel and various copper alloys (such as bronze or brass), and porous sintered alloys may be used for the bearing unit 20. When the radial bearing 60 and thrust bearing 70 are made of copper alloy, the above described herringbone grooves can be formed by chemical etching, electrolytic etching or by manual means such as coining. In the case of a sintered alloy, herringbone grooves 65 can be formed by pressed powder or sinter sizing.

Next, the interaction of the rotating unitary shaft 30 and the bearing unit 20 supporting the shaft will be explained. When the rotating shaft 30 rotates from the action of motor 40, lubricant L from the oil reservoir 67 enters into the gap between the outer periphery of the rotating unitary shaft 30 and bearing surfaces 63 and 64 of the radial bearing 60, and between the thrust bearing surface 71 of the thrust bearing 70 and the lower end surface 36 of the rotary shaft 30, and forms an oil film. Lubricant L is efficiently supplied to the outer peripheral surface of rotary unitary shaft 30 by passing through the peripheral groove 35. In the radial bearing 60, dynamic pressure is generated when lubricant L is supplied to herringbone grooves 65 formed on its inner peripheral surface. In the thrust bearing 70, dynamic pressure is generated when lubricant L is supplied to spiral grooves 72. Thus, the rotating unitary shaft 30 is supported with high stiffness by dynamic pressure generated on the radial side and the thrust side.

As shown in FIG. 5, the rotating unitary shaft 30 receives a thrust dynamic pressure force Fw from the thrust bearing 70 and a thrust dynamic pressure force Fa opposite to the force Fw and received from the conical bearing surface 64 of the radial bearing 60. The conical portion 34 of the rotating shaft 30 receives dynamic pressure force Ft in a slanted direction against its outer peripheral surface of the conical portion 34. As shown in FIG. 5, the dynamic pressure force Ft is a synthesis of radial dynamic pressure force Fr, a component of force Ft perpendicular to the axial direction, and a component of force Ft in the axial direction, a thrust dynamic pressure force Fa. Thrust dynamic pressure force Fa is directed toward the thrust bearing 70 because the conical portion 34 expands toward the thrust bearing 70. Consequently the thrust dynamic pressure force Fa is opposite to the thrust dynamic pressure force Fw from the thrust bearing 70.

The rotating unitary shaft 30 receives mutually opposing thrust dynamic pressure forces from the thrust bearing 70 and the conical bearing surface 64 of radial bearing 60, positioning the shaft in the axial direction and producing shock resistance by preventing the shaft from falling out. Accordingly, the present invention ensures shock resistance with a simple construction merely by forming the conical portion 34 and conical bearing surface 64, and without any special materials and dynamic pressure grooves. This makes the present invention useful for reducing thickness of the product and superior for mass production. The provided design achieves positioning of the rotating shaft 30 in the axial direction without relying on the action of a magnet, thus suppressing the loss of drive pressure in the motor 40 and achieving higher electrical efficiency. Further, quietness is ensured because there is no need to stagger magnetic centers of the motor stator 42 and the motor magnet 43 in order to position the rotating unitary shaft 30 in the axial direction.

The preferred embodiment of the present invention having the rotating unitary shaft 30 supported by the radial bearing 60 and the thrust bearing 70 as described, an optimization of bearing stiffness and bearing loss is achieved resulting in both high bearing stiffness and little bearing loss. The proportions of effective lengths of straight bearing surface 63 and conical bearing surface 64 in the axial direction as well as the angle of expansion (taper angle) θ of the conical portion 34 can be determined to accomplish the above optimization.

Although the preferred embodiment is described as having herringbone grooves for generating dynamic pressure formed on the straight bearing surface 63 and the conical bearing surface 64 of the radial bearing 60, the grooves for generating dynamic pressure can also be in the lobe form, shown in FIG. 6. Here, a plurality of oil reserving grooves 68 are formed at equal peripheral intervals extending in the axial direction on the inner peripheral surface of the radial bearing 60. Wedge-shaped grooves 69 are formed between the oil reserving grooves 68 with gaps between the radial bearing 60 and the rotating shaft becoming smaller in the direction of rotation of the rotating shaft 30. Wedge-shaped grooves 69 may be formed on the straight bearing surface 63 and herringbone grooves 65 may be formed on the conical bearing surface 64. The reverse combination of the grooves may also be adopted. It is also possible to form wedge-shaped grooves 69 on both bearing surfaces 63 and 64. The present invention may be used with magnetic fluids or some other suitable oil.

Various embodiments of the present invention will be explained next. These embodiments are all variations in designs and assembly of the rotating shaft and bearing unit. Since the reference drawings use the same elements of construction and the same codes as in the first described embodiment, their explanations are abbreviated.

The second embodiment of the present invention is shown in FIG. 7. The radial bearing 60 in the bearing unit 20 of the second embodiment is housed in cylindrical housing 90. The radial bearing 60 is either pressed into housing 90 or fastened, for example, by welding, adhesion. Then housing 90 is housed by the same means in holder 11 of the base 10. In the described embodiment, the thrust bearing 70 is fastened by being inserted into the annular stage 91 formed on the inner peripheral edge of the lower surface of the housing 90.

Another embodiment of the present invention is shown in FIG. 8.

The radial bearing 60 of the bearing unit 20 of the third embodiment is not housed in the housing 90 in the same manner as the first embodiment. The vertical hole 37 and the horizontal hole 38 are formed as oil passages inside the rotating unitary shaft 30. The vertical hole 37 is formed at the axial center of the conical portion 34, with its lower end passing through a pocket 37*a* and opening onto the lower end surface 36 opposing the thrust bearing 70. Horizontal holes 38 branch out from the upper end of the horizontal hole 37 and connect to the peripheral groove 35. Although horizontal holes 38 branch out from the vertical hole 37 are formed as two mutually straight holes, it is possible to form these holes as radials of three or more with equal circumferences. Also, a plurality of penetration holes 60*c* (only one is shown in FIG. 8) may be formed in the radial bearing 60 connecting the upper surface of the cavity 67 to the oil reservoir.

In this third preferred embodiment, lubricant L from the reservoir 67 is supplied to the thrust bearing surfaces (the lower end surface 36 of the rotating unitary shaft 30 and the thrust bearing surface 70) along with rotation of the rotating shaft 30. The lubricant is also supplied through the vertical hole 37, horizontal holes 38 and peripheral groove 35 to the radial bearing surfaces (outer surface of the rotating shaft 30 and the inner surface of the radial bearing 60). The outer surface of the shaft is divided into the straight portion 33 and the conical portion 34. Lubricant L goes down to the conical portion 34, returns to the oil reservoir 67, and rises at the straight portion 33. When lubricant L overflows onto the upper surface of the radial bearing 60, it falls through provided penetration holes 60*c* and returns to the oil reservoir 67. Arrows in FIG. 8 show the circulation route of the lubricant, with the idea of a smooth circulation of lubricant L.

The fourth embodiment of the present invention is shown in FIG. 9.

The radial bearing 60 of the bearing unit 20 of the fourth embodiment is housed in the housing 90 in the same manner as the second embodiment. The rotary unitary shaft 30 is installed into the radial bearing 60. In this case, a groove 60*d* is formed in the radial bearing 60 starting from its outer peripheral surface and continuing along its lower surface as a lubricant passage, so that lubricant L overflowing on the upper surface of the radial bearing 60 can return to the oil reservoir 67 through the groove 60*d*.

As explained above, by following the spindle motor of the present invention, positioning of the rotating shaft in the axial direction relative to the radial dynamic pressure bearing is regulated by means of a conical portion of the rotating shaft, quietness and rotation precision are of course sufficiently ensured, the number of parts is held down and positioning of the rotating unitary shaft is achieved with a simple construction, together with this increase in shock resistance and thinning are achieved, and further various results are achieved toward bearing stiffness of the radial bearing and the straight bearing as well as minimization of bearing loss.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A spindle motor comprising:
   a rotating unitary shaft supported for rotation by a radial fluid dynamic bearing and a thrust fluid dynamic bearing;
   rotating means secured to said rotating unitary shaft; and
   a motor generating an electromagnetic force for rotating said rotating means, wherein said unitary shaft comprises a conical portion at one end of said shaft, said conical portion having an outer diameter expanding gradually toward said thrust fluid dynamic bearing and a straight portion having a fixed outer diameter;

wherein said thrust fluid dynamic bearing is formed immediately at a bottom of said conical portion;

wherein fluid is supplied between each of said fluid dynamic bearings and an entire surface of said rotating unitary shaft including an entire surface of said bottom of said conical portion, and wherein said radial fluid dynamic bearing comprises a conical bearing surface and a straight bearing surface, said conical bearing surface corresponding to said conical portion of the rotating unitary shaft, and said straight bearing surface corresponding to said straight portion of the rotating unitary shaft.

2. The spindle motor according to claim 1 further comprising a plurality of herringbone grooves extending from said conical bearing surface onto said straight bearing surface.

3. The spindle motor according to claim 1 further comprising a plurality of herringbone grooves formed on said conical bearing surface, and a plurality of wedge-shaped grooves formed on said straight bearing surface wherein apexes of said wedge-shaped grooves point toward the direction of rotation of said rotating unitary shaft.

4. The spindle motor according to claim 2 further comprising a plurality of wedge-shaped grooves formed on said straight bearing surface wherein apexes of said wedge-shaped grooves point toward the direction of rotation of said rotating unitary shaft.

5. The spindle motor according to claim 1 further comprising a plurality of spiral grooves formed on a thrust bearing surface of said thrust fluid dynamic bearing, said thrust bearing surface corresponding to said bottom of said conical portion.

6. The spindle motor according to claim 2 further comprising a plurality of spiral grooves formed on a thrust bearing surface of said thrust fluid dynamic bearing, said thrust bearing surface corresponding to said bottom of said conical portion.

7. The spindle motor according to claim 1 further comprising a plurality of herringbone grooves formed on a thrust bearing surface of said thrust fluid dynamic bearing, said thrust bearing surface corresponding to said bottom of said conical portion.

8. The spindle motor according to claim 2 further comprising a plurality of herringbone grooves formed on a thrust bearing surface of said thrust fluid dynamic bearing, said thrust bearing surface corresponding to said bottom of said conical portion.

9. The spindle motor according to claim 1 further comprising a peripheral groove formed at a boundary between said straight portion and said conical portion on an outer peripheral surface of said rotating unitary shaft.

10. The spindle motor according to claim 2 further comprising a peripheral groove formed at a boundary between said straight portion and said conical portion on an outer peripheral surface of said rotating unitary shaft.

11. The spindle motor according to claim 1, wherein said radial fluid dynamic bearing is housed inside a housing.

12. The spindle motor according to claim 2, wherein said radial fluid dynamic bearing is housed inside a housing.

* * * * *

UNITED STATES PATENT AND TRADEMARK OFFICE
CERTIFICATE OF CORRECTION

PATENT NO. : 7,218,023 B2  Page 1 of 1
APPLICATION NO. : 10/331698
DATED : May 15, 2007
INVENTOR(S) : Hirose et al.

It is certified that error appears in the above-identified patent and that said Letters Patent is hereby corrected as shown below:

Title Page item 73
In the Assignee section item (73) on the cover page, please add as co-assignee:
--Hitachi Powdered Metals Co., Ltd., Chiba-Ken (JP)--

Signed and Sealed this

Twenty-eighth Day of October, 2008

JON W. DUDAS
*Director of the United States Patent and Trademark Office*